Oct. 26, 1948.  S. T. WILLIAMS  2,452,215
VALVE FOR INSECTICIDE SPRAYS
Filed Aug. 5, 1944
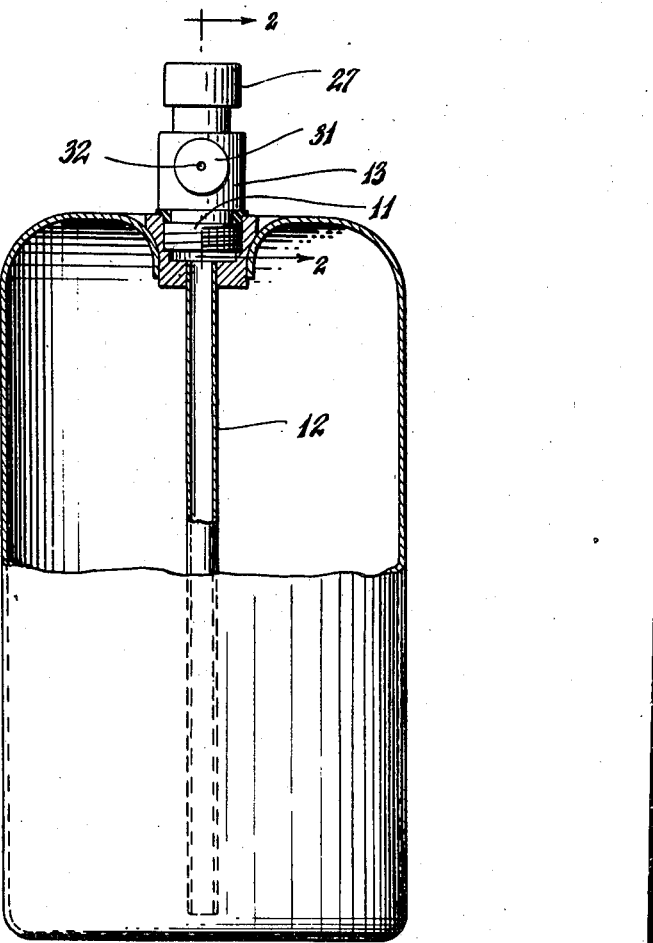
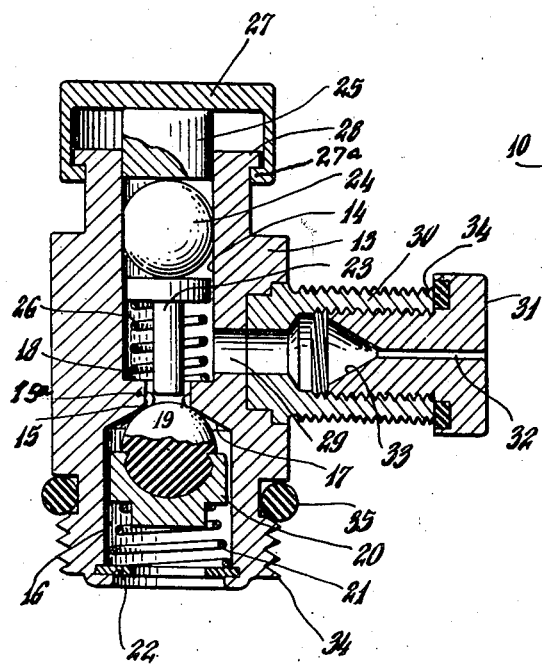
INVENTOR.
Selden T. Williams
BY
Fraser, Myers & Manley
ATTORNEYS Patented Oct. 26, 1948

2,452,215

UNITED STATES PATENT OFFICE 2,452,215

VALVE FOR INSECTICIDE SPRAYS

Selden T. Williams, Bellerose, N. Y., assignor to Scovill Manufacturing Company, Waterbury, Conn., a corporation of Connecticut Application August 5, 1944, Serial No. 548,293

5 Claims. (Cl. 251—137)

My present invention relates to a manually controllable valve for insecticide sprays and more particularly to such valve especially adapted for application to small pressure containers suitable for hand use in which an insecticide solution is contained under high pressure.

Sometime ago there has come into extensive use by the Army and the Navy, for sterilizing airplanes, tents and all enclosures where insect life would be annoying and dangerous to health, certain insecticides dissolved, admixed or suspended in liquefied gas contained under pressure in small steel cylinders or bottles, which liquefied gas when released from the container carries with it the active insecticide material. Upon release, the liquid evaporates almost instantaneously upon exposure to the air and the toxic insecticide material becomes fully and widely dispersed in the air in the form of very fine particles. Freon gas (dichlor-difluor-methane) has been found to be an excellent carrier for such insecticides as DDT (dichlor-diphenyl-trichlorethane) and pyrethrin when used with oil of sesame or other solvents or carriers. The Freon preferably in liquefied form is mixed with the insecticide solution and charged into a container wherein at normal temperature the Freon develops a high pressure—approximately 85 p. s. i. as long as any liquid Freon is present. These containers heretofore have been provided with various means for releasing in spray form the insecticide mixture but said means have not been as efficient and foolproof as desirable.

My present invention accordingly has for its objects: (1) to provide a manually operable valve for attachment to an insecticide container of the character specified, the valve having a spray nozzle associated herewith so that a fine spray of the Freon or other liquefied gas together with the insecticide will be discharged to the atmosphere when the valve is opened; (2) to provide a valve through which the container can be readily filled and refilled; (3) to provide a valve which will hold the pressure effectively and atomize the container contents completely and (4) to provide a valve which will be simple in construction, foolproof in use and which can be manufactured economically.

In its preferred embodiment, my improved valve comprises a casing adapted for attachment to a pressure container or steel bottle, said casing having two rubber balls, the lower one being held against a valve seat by spring pressure plus the gas pressure in the container and adapted to be displaced or dimpled on its surface by manual pressure through a button, a deflator pin, the upper ball and a secondary plunger. The casing preferably carries a removable nozzle for convenience in cleaning and to permit a full flow of the mixture of Freon and insecticide mixture into the container when charging the same. The invention will be better understood from the detailed description which follows when considered in connection with the accompanying drawing wherein:

Figure 1 is a side elevation of a valve embodying my invention attached to a pressure bottle or container, parts of the latter being broken away to show the relationship of parts and Fig. 2 is a section taken substantially along the plane of the line 2—2 of Fig. 1, parts of the valve structure being shown in elevation.

Referring to the drawings the reference numeral 10 indicates a steel cylinder or container having an internally screw-threaded mouth 11 which carries an open-ended tube 12 extending downwardly into the bottle to near the bottom thereof. This bottle is of a type adapted and heretofore used for containing liquid gas and insecticide mixtures under pressure and no novelty is alleged to reside therein.

Screw-threadedly connected to the mouth of the bottle is the valve of my invention, said valve comprising a casing or body portion 13 of generally tubular form, the bore through said tube being of different diameters, designated respectively as 14, 15 and 16, the bore portion 15 being provided by an internal annular rib 15a, one face 17 of which is conical in form and constitutes a valve seat and the other face 18 of which is flat and constitutes an abutment shoulder. Within the bore portion 16 is a compressible elastic ball 19 preferably formed of synthetic rubber, said ball being mounted in a ball cup 20 which is normally urged in a direction toward the valve seat 17 by a coil spring 21, one end of which bears against the ball cup and the other end of which bears against a washer 22 held within the casing adjacent its container engaging end. Within the bore 14 there is disposed a packed plunger means consisting of a headed deflator pin 23, a second synthetic rubber ball 24 and a plunger 25, the ball being initially somewhat deformed between the deflator head and the plunger 25 and providing a packed closure for the bore. The end of the deflator pin is normally held out of contact with the ball 19 by a coil spring 26 which bears at one end against the shoulder 18 and at its other end against the head of the deflator pin. To insure deformation of the ball 24 to seal the bore 14, outward movement of the plunger 25 is limited by means of a button or cap 27 which is swivelly and telescopically mounted over the end of the casing, said outward movement of the cap being limited by a flange 28 at the outer end of the casing and a cooperating flange 27a on the cap.

The casing 13 between the shoulder 18 and the head of the deflator pin 23 is formed with a lateral opening 29 in its wall and the outer wall of the casing is recessed around said opening and accommodates a tubular stem 30, the bore of which is in axial alignment with the opening 29. Preferably the stem is fixedly secured to the casing and is both internally and externally threaded for purposes which will presently appear.

Removably mounted within the bore of the stem 30 is a nozzle 31 having a relatively small axial opening 32 there-through which at its inner end tapers outwardly to provide a large conical recess 33. The nozzle at its outer end has an enlarged head, the inner face of which is recessed and carries a compressible packing 34 adapted to provide a leak-tight seal with the end of the stem.

For attaching the casing 13 to the bottle or container 10 the end of the casing opposite to that provided with the cap or button 27 is externally screw-threaded as indicated at 34 and above said screw threads the casing is formed with an annular recess within which is disposed a packing O ring 35 for providing a leak-tight seal with the mouth of the bottle when the casing is attached thereto.

The valve as above described when attached to a pressure container as shown is adapted for use in the following manner: To charge the container with an admixture or solution of insecticide and liquid gas, the nozzle 31 is first removed from the stem 30, a coupling connection is made with the external thread on said stem, the button or cap 27 is pressed downwardly to the full extent of its movement thereby unseating the wall valve 19 whereupon the mixture of insecticide and liquid gas can be injected through the coupling connection into the container preferably at low temperature. When a predetermined quantity of the mixture has been charged into the container, pressure on the cap 27 is released whereupon the spring 21 plus the gas pressure in the container will seat the ball valve 19 and hold it on its seat. The nozzle 31 is then threaded into the stem 30 and the device is ready for use. In such use the bottle or container is held in one hand and pressure is applied to the cap 27, which pressure acting through the plunger 25, ball 24, and deflator pin 23 will first operate against the tension of spring 26 to deform the ball 24 against the wall of the bore, thus preventing leakage past the plunger, and continued pressure with cap operates against the tension of the spring 18 to press against the ball 19. It is not intended that this pressure be so great as to bodily displace the ball 19 but on the contrary to merely dimple it out of round and thereby permit the fluid under pressure from the bottle to go past the ball and out through the nozzle in proportion to the dimpling. Of course, complete unseating of the ball by full downward movement of the cap 27 will permit of a full blast of the container contents. Release of the downward pressure on the cap 27 will automatically cause a seating of ball valve 19 and a stoppage of the discharge from the container.

As hereinbefore stated, upon release from the container of the liquid gas it will carry with it the active insecticide material and as the liquid gas evaporates almost instantaneously upon exposure to the air this evaporation plus the atomizing action of the valve will disseminate the toxic insecticide material throughout the entire area into which it is released thereby killing the insect life within the confined space. When the contents of the container have been completely discharged it may be recharged in the manner hereinbefore explained.

My invention it will thus be apparent provides a simple, efficient and practically fool-proof valve for insecticide sprays of the type specified and thereby renders such valves and the containers capable of repeated use and long life.

While I have shown and described a preferred embodiment of my valve, I do not wish to be limited to the precise details of construction disclosed since these may be varied within the range of engineering skill without departing from the spirit of my invention as defined in the accompanying claims.

What I claim is:

1. A valve device of the character set forth, comprising a casing having a passage therethrough, an annular rib extending into said passage intermediate the ends thereof, one face of said rib being formed to constitute a valve seat, a deformable elastic check valve having a convex seating face engaging the valve seat, a spring for seating the check valve, a deflator pin, a deformable elastic stuffing member and a plunger in the passage of the casing on the side of the rib opposite to the valve seat, the stuffing member being disposed between the deflator pin and the plunger and held under deformation thereby to provide a packed closure for the passage in the casing, a spring normally holding the check valve engaging end of the deflator pin out of contact with the check valve, means at the outer end of the casing limiting the outward movement of the plunger, and the casing having an opening through its side wall in open communication with the passage between the rib and the stuffing member.

2. A valve device according to claim 1 wherein the portions of the passage through the casing on opposite sides of the annular rib are of different diameters and the check valve and the stuffing member disposed in said portions of the passage are of substantially the same form and material.

3. A valve device according to claim 1 wherein the check valve and the stuffing member are each elastic balls.

4. A valve device of the character set forth, comprising a casing having a passage therethrough, an annular rib extending into said passage intermediate the ends thereof, one face of said rib being formed to constitute a valve seat, a deformable elastic check valve engaging the valve seat, a deflator pin, a floating deformable elastic stuffing member, a plunger, and a spring in the passage of the casing on the side of the rib opposite to the valve seat, the stuffing member being disposed between the deflating pin and the plunger and held under deformation against the plunger by the spring to provide a packed closure for the passage in the casing, means limiting the outward movement of the plunger and the casing having an opening through its side wall in open communication with the passage between the rib and the stuffing member.

5. A valve device of the character set forth comprising a casing having a passage therethrough, a valve seat in said passage, a check valve engaging said seat, a deflator means in the passage on the side of the valve seat opposite that to which the check valve seats, manually operable means adapted for limited movement at the outer end of the casing, a deformable elastic stuffing member in the casing between the said manually operable means and the deflating means, a spring normally holding said deflator means out of check valve unseating position and the stuffing member under deformation to provide a packed closure for the passage in the casing, and the casing having an opening through its wall in open communication with the portion of the passage therein between the stuffing member and the valve seat.

SELDEN T. WILLIAMS.

REFERENCES CITED

The following references are of record in the file of this patent:

UNITED STATES PATENTS

| Number | Name | Date |
|---|---|---|
| 98,153 | Deck | Dec. 21, 1869 |
| 408,701 | Everett | Aug. 13, 1889 |
| 710,674 | Fassman | Oct. 7, 1902 |
| 971,646 | Luerk et al. | Oct. 4, 1910 |
| 1,228,388 | Bargar | June 5, 1917 |
| 1,378,426 | Sackett | May 17, 1921 |
| 1,444,189 | Key | Feb. 6, 1923 |
| 1,691,626 | Cook | Nov. 13, 1928 |
| 1,847,281 | Uhri, Jr. | Mar. 1, 1932 |
| 1,892,750 | Rotheim | Jan. 3, 1933 |
| 2,143,655 | Heller | Jan. 10, 1939 |
| 2,309,388 | Gibbons | Jan. 26, 1943 |

Certificate of Correction

Patent No. 2,452,215.   October 26, 1948.

SELDEN T. WILLIAMS

It is hereby certified that error appears in the above numbered patent requiring correction as follows:

In the grant, lines 2 and 13, name of assignee, for "Scovil" read *Scovill*; and that the said Letters Patent should be read with this correction therein that the same may conform to the record of the case in the Patent Office.

Signed and sealed this 25th day of January, A. D. 1949.

[SEAL]

THOMAS F. MURPHY,
*Assistant Commissioner of Patents.*